(12) United States Patent
Glowacka et al.

(10) Patent No.: US 12,130,873 B1
(45) Date of Patent: Oct. 29, 2024

(54) SYSTEM AND METHOD FOR RESPONDING TO USER INQUIRIES

(71) Applicant: Blue Sky Profit LLC, Sheridan, WY (US)

(72) Inventors: Anna Glowacka, Warsaw (PL); Pawel Glowacki, Kernersville, NC (US)

(73) Assignee: BLUE SKY PROFIT LLC, Sheridan, WY (US)

( * ) Notice: Subject to any disclaimer, the term of this patent is extended or adjusted under 35 U.S.C. 154(b) by 31 days.

(21) Appl. No.: 17/868,359

(22) Filed: Jul. 19, 2022

Related U.S. Application Data

(60) Provisional application No. 63/224,153, filed on Jul. 21, 2021.

(51) Int. Cl.
*G06F 16/9535* (2019.01)

(52) U.S. Cl.
CPC .................. *G06F 16/9535* (2019.01)

(58) Field of Classification Search
CPC .................................................. G06F 16/9535
See application file for complete search history.

(56) References Cited

U.S. PATENT DOCUMENTS

| | | | |
|---|---|---|---|
| 7,991,780 B1 * | 8/2011 | Anderson | G06F 16/9038 707/765 |
| 8,769,417 B1 | 7/2014 | Robinson et al. | |
| 8,832,117 B2 | 9/2014 | Su | |
| 8,903,914 B2 | 12/2014 | Paparizos et al. | |
| 8,909,653 B1 | 12/2014 | Su | |
| 8,949,360 B1 | 2/2015 | Jackson et al. | |
| 9,237,123 B2 | 1/2016 | Marcucci et al. | |
| 9,769,102 B2 | 9/2017 | Yamada et al. | |
| 10,162,897 B2 | 12/2018 | Kang et al. | |
| 2012/0095978 A1 * | 4/2012 | Levin | G06F 16/9535 707/706 |
| 2012/0167007 A1 | 6/2012 | Ross et al. | |
| 2012/0173992 A1 | 7/2012 | D'Angelo et al. | |
| 2014/0280094 A1 * | 9/2014 | Brandstetter | G06F 16/9538 707/723 |
| 2014/0317533 A1 | 10/2014 | Badodi | |
| 2015/0012602 A1 * | 1/2015 | Schorzman | G06F 40/134 709/206 |
| 2017/0149865 A1 | 5/2017 | Banatwala et al. | |
| 2020/0159772 A1 * | 5/2020 | Zoumpoulakis | G06F 16/907 |

* cited by examiner

*Primary Examiner* — Grace Park
(74) *Attorney, Agent, or Firm* — John Rizvi; John Rizvi, P.A.—The Patent Professor

(57) ABSTRACT

A user inquiry funnel system and method that enables an individual to submit an inquiry that is analyzed and sent to a specific group of individuals involved in a relevant and specific industry to determine whether they can provide an answer. A specific user inquiry funneling mechanism is deployed that parses the inquiry into multiple individual words and maps them against tags and variants thereof to determine whether there is a matching between any ones of the tags and variants thereof with any ones of the individual words. Based on the mapping results, a listing of matching tags and variants is produced that facilitates the identifying of responding users that are associated with any ones of the matching tags and variants thereof and that have provided one or more pre-defined replies. This allows for establishing of a communication between the inquiring user and one or more responding users.

16 Claims, 11 Drawing Sheets

FIG. 7

700
Q1: I am looking for a healthy american or vegan burger in NYC?
702
     718-1   718-2   718-3   718-4
Q2: I am looking for a DJ for this Sunday in Miami for a party?
704
     720-1   720-2   720-3   720-4
Q3: Delta I have problems buying a ticket?
706
     722-1   722-2   722-3   722-4
Q4: Walmart, do you sell bio yogurt in my location?
708
     724-1   724-2   724-3   724-4   724-5
Q5: Looking for an experienced makeup and hair stylist for my wedding on March 12th?
710
     726-1   726-2
Q6: I need a haircut before Friday, anyone available?
712
     728-1   728-2   728-3
Q7: My water pipe just burst, any plumbers nearby?
Adidas, do you have those shoes in black size 44?
     728-4   728-5   728-6   728-7
714   730
Q7: Wonderful loft unit features 10 ft ceilings, extended terrace around the unit, Italian cabinets, stainless steel appliances, great view of the city and partial ocean view. The Loft 2 offerss residents great amenities, including a lap pool (located on the ground-floor level); a rooftop pool, hot tub, and sundeck; sauna; clubroom; and a rooftop fitness center. It's within walking distance to Bayfront Park the shops and restaurants at Bayside Marketplace, and the American Airlines Arena. This great corner unit has concrete floors, open floopr plans and a stacked washer/dryer.

FIG. 8

| | | | | | |
|---|---|---|---|---|---|
| WORD 1 | WORD 2 | WORD 3 | WORD N | NOT WORDS |

800, 802, 804, 806, 808, 810

812

| TAG TYPE/TOPIC ~ 814 | TAG ~ 816 |
|---|---|
| LOCATION ~ 818 | NEW YORK CITY (NYC) ~ 820 |
| LOCATION | MIAMI |
| CATEGORY | SERVICE |
| CATEGORY ~ 822 | RESTAURANT ~ 824 |
| CATEGORY ~ 826 | BURGER ~ 828 |
| CATEGORY | PHOTOGRAPHER |

830

| TAG TYPE/TOPIC (814) | TAG (816) |
|---|---|
| LOCATION ~ 818 | NYC ~ 836 |
| CATEGORY ~ 826 | BURGER ~ 828 |
| CUISINE ~ 830 | VEGAN ~ 832<br>AMERICAN ~ 834 |

FIG. 9

| USER NAME | USER ID | USER CONTACT INFORMATION |
|---|---|---|
| QUESTION RECEIPT PREFERENCE | USER INFORMATION | USER-CREATED KEYWORD REPLIES |
| FINANCIAL INFORMATION | OTHER INFORMATION ||

SYSTEM AND METHOD FOR RESPONDING TO USER INQUIRIES

CROSS-REFERENCE TO RELATED APPLICATION

This application claims the benefit of U.S. Provisional Patent Application 63/224,153, filed Jul. 21, 2021, which is hereby incorporated by reference herein in its entirety.

FIELD OF THE INVENTION

The present invention relates generally to communications platforms, and more particularly, to a system and method that facilitates answering a user's inquiry and connecting the user with a responding party to the inquiry.

BACKGROUND OF THE INVENTION

Today, using the Internet and the World Wide Web a person may access a plethora of information, data, and other content from any device able to execute any search query and interact with and connect with other parties. For example, a user's smartphone provides real-time access for answering any user query no matter how esoteric. A search engine is a software system that is designed to carry out web searches and these software utilities search the World Wide Web in a systematic way for particular information specified in a textual or audio/verbal web search query. The classic search interaction is the user inputs a question, the search engine seeks the answer(s), and the search results are generally presented in a line of results, often referred to as search engine results pages (SERPs). The information may be a mix of links to web pages, images, videos, infographics, articles, research papers, and other types of files or information. Some search engines also mine data available in databases or open directories. The user initiating the query may then interact with the other parties through their web pages and other electronic platforms at their individual discretion.

Another communication platform aimed at connecting one person with another is online dating services. Many singles are enlisting the use of electronic matchmaking services as a substitute for traditional dating means hoping to find a more convenient and effective dating experience. Conventionally, web-based dating and telephone-based dating are well-known alternative dating mechanisms In web-based, or online matchmaking services, an individual first becomes a subscriber by completing a detailed profile and providing various details about themselves such as age, geographic location, physical characteristics, and likes and dislikes. The individual then searches for others by entering similar criteria such as age range, geographic location, and desired physical characteristics. After searching, the individual can review the matching user profiles, which typically contain a photograph. The individual then decides which of the matching users they would like to potentially meet and sends them an email in the hope of receiving a response. Users then get to know one another by initially exchanging a-mails that may then lead to a face-to-face meeting.

Still other communications platforms aimed at connecting people use a real-time feed such that one person is able to follow another person's whereabouts and interact with them based on what the other person is reporting in their feed. Popular platforms such as Instagram, Facebook. Twitter, and LinkedIn are examples of such communications platforms and are currently used by millions of people on a worldwide basis. Some of these platforms further facilitate direct messaging between one or more individuals for their interacting with one another. However, despite the many advantages of these existing platforms that facilitate communications between individuals there remains a need for a system that receives a user's question analyzes it and sends the question to a specific group of individuals involved in a relevant and specific industry to determine whether they can provide an answer.

Accordingly, there is need for an improved communications technique and system that provides an individual with the ability to submit a question that the system will analyze and send the question to a specific group of individuals involved in a relevant and specific industry to determine whether they can provide an answer.

SUMMARY OF THE INVENTION

The present invention is directed to providing a system and method that provides an individual with the ability to submit a question that the system will analyze and send the question to a specific group of individuals involved in a relevant and specific industry to determine whether they can provide an answer.

In a first implementation of the invention, a user inquiry funnel system is provided that enables an individual with the ability to submit a question that the system will analyze and send the question to a specific group of individuals involved in a relevant and specific industry to determine whether they can provide an answer. The system comprising at least; a processor and a memory storing instructions that when executed cause the processor to perform operations comprising: (i) receiving an inquiry from an inquiring user; (ii) parsing the inquiry received into a plurality of individual words and retrieving a plurality of tags and variants thereof, each tag and variants thereof associated with a tag topic; (iii) mapping each individual word of the plurality of words against the plurality of tags and variants thereof retrieved and determining whether there is a matching of any ones of the plurality of tags and variants thereof with any ones of the individual words of the plurality of individual words; (iv) producing, based on the mapping and the matching determination, a listing of matching tags and variants thereof, the listing of matching tags and variants thereof produced being grouped by the tag topic associated therewith; (v) identifying whether any ones of a plurality of responding users are associated with the matching tags and variants thereof from the listing produced; and (vi) if there is at least one responding user identified as being associated with any ones of the matching tags and variants from the listing produced, transmitting the inquiry received to the at least one responding user identified, and transmitting, to the inquiring user, one or more pre-defined replies provided by the at least one responding user identified, each one of the one or more pre-defined replies being associated with at least one of the matching tags and variants thereof from the listing produced.

In a second aspect, a method is provided that enables an individual with the ability to submit a question that will be analyzed and sending the question to a specific group of individuals involved in a relevant and specific industry to determine whether they can provide an answer. The method comprising: (i) receiving an inquiry from an inquiring user; (ii) parsing the inquiry received into a plurality of individual words and retrieving a plurality of tags and variants thereof, each tag and variants thereof associated with a tag topic; (iii)

mapping each individual word of the plurality of words against the plurality of tags and variants thereof retrieved and determining whether there is a matching of any ones of the plurality of tags and variants thereof with any ones of the individual words of the plurality of individual words; (iv) producing, based on the mapping and the matching determination, a listing of matching tags and variants thereof, the listing of matching tags and variants thereof produced being grouped by the tag topic associated therewith; (v) identifying whether any ones of a plurality of responding users are associated with the matching tags and variants thereof from the listing produced; and (vi) if there is at least one responding user identified as being associated with any ones of the matching tags and variants from the listing produced, transmitting the inquiry received to the at least one responding user identified, and transmitting, to the inquiring user, one or more pre-defined replies provided by the at least one responding user identified, each one of the one or more pre defined replies being associated with at least one of the matching tags and variants thereof from the listing produced.

In a third aspect, a user inquiry funnel application (alternatively referred to herein as an "app") may be executed on the user inquiry funnel system and/or a user device for providing an individual with the ability to submit a question that will be analyze and sending the question to a specific group of individuals involved in a relevant and specific industry to determine whether they can provide an answer. The application comprising operations for (i) receiving an inquiry from an inquiring user; (ii) parsing the inquiry received into a plurality of individual words and retrieving a plurality of tags and variants thereof, each tag and variants thereof associated with a tag topic; (iii) mapping each individual word of the plurality of words against the plurality of tags and variants thereof retrieved and determining whether there is a matching of any ones of the plurality of tags and variants thereof with any ones of the individual words of the plurality of individual words; (iv) producing, based on the mapping and the matching determination, a listing of matching tags and variants thereof, the listing of matching tags and variants thereof produced being grouped by the tag topic associated therewith; (v) identifying whether any ones of a plurality of responding users are associated with the matching tags and variants thereof from the listing produced; and (vi) if there is at least one responding user identified as being associated with any ones of the matching tags and variants from the listing produced, transmitting the inquiry received to the at least one responding user identified, and transmitting, to the inquiring user, one or more pre-defined replies provided by the at least one responding user identified, each one of the one or more pre-defined replies being associated with at least one of the matching tags and variants thereof from the listing produced.

In a fourth aspect, if there is not at least one responding user identified as being associated with any ones of the matching tags and variants thereof from the listing produced, identifying at least one responding user of the plurality of responding users that is associated with at least one tag and variant thereof of each associated tag topic of the plurality of tags and variants thereof retrieved; and transmitting to the inquiring user one or more pre-defined replies provided by the at least one responding user identified that is associated with at least one tag and variant thereof of each associated tag topic of the plurality of tags and variants thereof retrieved.

In a fifth aspect, transmitting an indication of interest from the inquiring user based on the one or more pre-defined replies as provided by the at least one responding user identified that is associated with at least one tag and variant thereof of each associated tag topic of the plurality of tags and variants thereof retrieved.

In a sixth aspect, establishing, responsive to the indication of interest transmitted, a communication between the inquiring user and the at least one responding user identified that is associated with at least one tag and variant thereof of each associated tag topic of the plurality of tags and variants thereof retrieved.

In a seventh aspect, a user profile is received for each one responding user of the plurality of responding users, the user profile containing a plurality of pre-defined replies, each pre-defined reply of the plurality of replies specific to a particular one tag and the variants thereof of the plurality of tags and variants thereof.

In an eighth aspect, the plurality of pre-defined replies are generated by each responding user as function of a plurality of keywords.

In another aspect, the inquiry is transmitted by the inquiring user using a mobile device.

In another aspect, the indication of interest transmitted is a message from the inquiring user to the at least one responding user identified that is associated with at least one tag and variant thereof of each associated tag topic of the plurality of tags and variants thereof retrieved.

In another aspect, the parsing of the inquiry into a plurality of individual words comprises identifying any word in the inquiry associated with a negative meaning.

In another aspect, receiving a respective user profile for each one responding user of the plurality of responding users, the respective user profile received containing a plurality of pre-defined replies, each pre-defined reply of the plurality of replies specific to a particular one tag and the variants thereof of the plurality of tags and variants thereof.

In another aspect, generating, by the each one responding user as function of a plurality of keywords, the plurality of pre-defined replies for the respective user profile received.

In another aspect, presenting the plurality of keywords to the each one responding user of the plurality of responding users; and selecting, by the each one responding user of the plurality of responding users, particular ones of the keywords to define a particular one pre defined reply of the plurality of pre-defined replies for the respective user profile received therefore.

In another aspect, the negative meaning is identified by a plurality of negative phrases comprising at least "do not include" and "not".

In another aspect, the inquiry received is formed as a question.

In another aspect, if there is not at least one responding user identified as being associated with any ones of the matching tags and variants thereof from the listing produced, the inquiry is transmitted to each responding user of the plurality of responding users that are associated with at least one tag of each associated tag topic.

In another aspect, a location of the inquiring user where the inquiry was created by the inquiring user is displayed on a mobile device.

In another aspect, the responding user is prevented from communicating with the inquiring user unless and until the inquiring user has provided the indication of interest.

In another aspect, a matching threshold is defined as a minimum number of matching tags and variants thereof with the individual words.

In another aspect, a communication is established between the inquiring user and the at least one responding user only in response to an indication of interest from the inquiring user based on the one or more pre-defied replies received.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 7 presents a series of illustrative questions with tags and their variants highlighted therein in accordance with an embodiment;

FIG. 8 presents an illustrative inquiry parsing and word mapping in accordance with an embodiment;

FIG. 9 presents a user profile in accordance with an embodiment;

Like reference numerals refer to like parts throughout the several views of the drawings.

DETAILED DESCRIPTION

Figure 1:
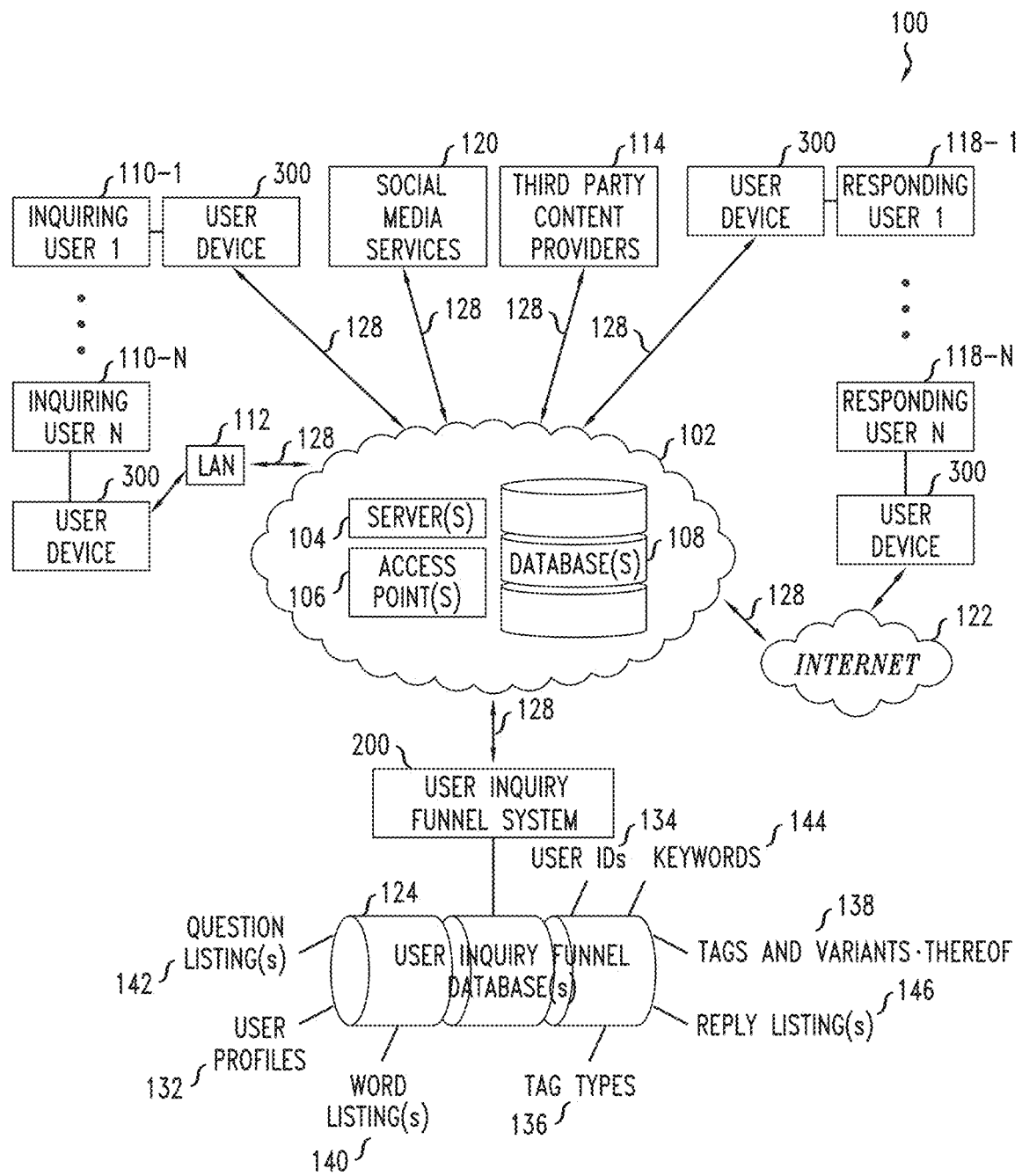
FIG. 1 presents a high-level block diagram of a cloud network services architecture for providing a user inquiry funnel system in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a user inquiry funnel system and method that enables an individual to submit an inquiry (e.g., a question) that will be analyzed and sending the question to a specific group of individuals involved in a relevant and specific industry to determine whether they can provide an answer. Importantly, the user inquiry funnel system and method of the disclosed embodiments provides an advantageous improvement of practical applications such as user search platforms and communications and/or messaging platforms. Communications/messaging and/or user search platform problems are solved by an efficient user inquiry funneling mechanism that receives an inquiry from an inquiring user and parses the inquiry into a plurality of individual words. The plurality of words is mapped against a plurality of tags and variants thereof to determine whether there is a matching between any ones of the plurality of tags and variants thereof with any ones of the individual words. Based on the mapping results, a listing of matching tags and variants is produced where the listing of matching tags and variants thereof is grouped by the associated tag topic therewith. This facilitates the identifying, from a plurality of responding users whether any ones of the responding users of the plurality of responding users are associated with any ones of the matching tags and variants thereof from the listing produced, and a transmitting, to the inquiring user, one or more pre-defined replies provided by such identified responding user, wherein each one of the one or more pre-defined replies is associated with at least one of the matching tags and variants thereof from the listing produced. This allows for establishing a communication between the inquiring user and one or more responding users only in response to an indication of interest from the inquiring user based on the one or more pre-defied replies received from the responding users.

FIG. 1 presents a high-level block diagram of a cloud network services architecture 100 for providing a user inquiry funnel system in accordance with an embodiment. For clarity and the avoidance of doubt, it will be understood that the use of the term "user" herein means any type of individual or user including, but not limited, an individual, corporate entity, business, and/or any other entity type. The term "inquiry" refers to a question, an issue that the user (i.e., the inquiring user) is having and seeking an answer or resolution. As shown for instance in FIG. 1, the cloud network services architecture 100 includes a cloud 102 comprising at least server(s) 104, access point(s) 106 and database(s) 108. As will be detailed herein below, the cloud 102 facilitates the delivery of the user inquiry funneling using user inquiry funnel system 200 to a plurality of inquiring users (e.g., the plurality inquiring users comprised by inquiring user 1 110-1 through inquiring user N 110-N and/or a plurality of responding users (responding user 1 118-1 through responding user N 118-N). Notably, the disclosed embodiments contemplate a subscription-based model for such inquiring users and responding users, as will be detailed hereinbelow. In an embodiment, the user inquiry funneling services, offered by and through the cloud network services architecture 100 and the user inquiry funnel system 200 will be facilitated by a user inquiry funnel app 400 (see, FIG. 4), as will be detailed herein below, executing on a user device 300 (see, e.g., FIGS. 1 and 3). The user device 300 provides the various users (e.g., inquiring user 1 110-1 and/or responding user 1 118-1) with real-time access to user inquiry funneling services in accordance with the disclosed embodiments herein.

As noted above, the cloud 102 comprises at least server(s) 104, the access point(s) 106 and the database(s) 108. Cloud, cloud service, cloud server and cloud database are broad terms and are to be given their ordinary and customary meaning to one of ordinary skill in the art and includes, without limitation, any database, data repository or storage media which store content typically associated with and managed by users, businesses, corporations, social media services (e.g., social media services 120) and third-party content providers (e.g., third-party content providers 114) in the context of search and communications/messaging platforms, to name just a few, to which the user inquiry funneling services are directed. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 300). The cloud server may be implemented in one or more servers and may send and receive content in a various forms and formats, user supplied and/or created information/content and profile/configuration data that may be read from or stored in a cloud database (e.g., the databases 108).

A cloud database may include one or more physical servers, databases or storage devices as dictated by the cloud service's storage requirements. The cloud database may further include one or more well-known databases (e.g., an SQL database) or a fixed content storage system to store content, user profile information, configuration information, administration information and any other information necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools. In this way, in accordance with various embodiments, the users may control, initiate, and engage in the user inquiry funneling herein in a fully transparent fashion without any required understanding of the underlying hardware and software necessary to interface, communicate, manipulate, and exchange information and/or data necessary to deliver such services.

Figure 2:
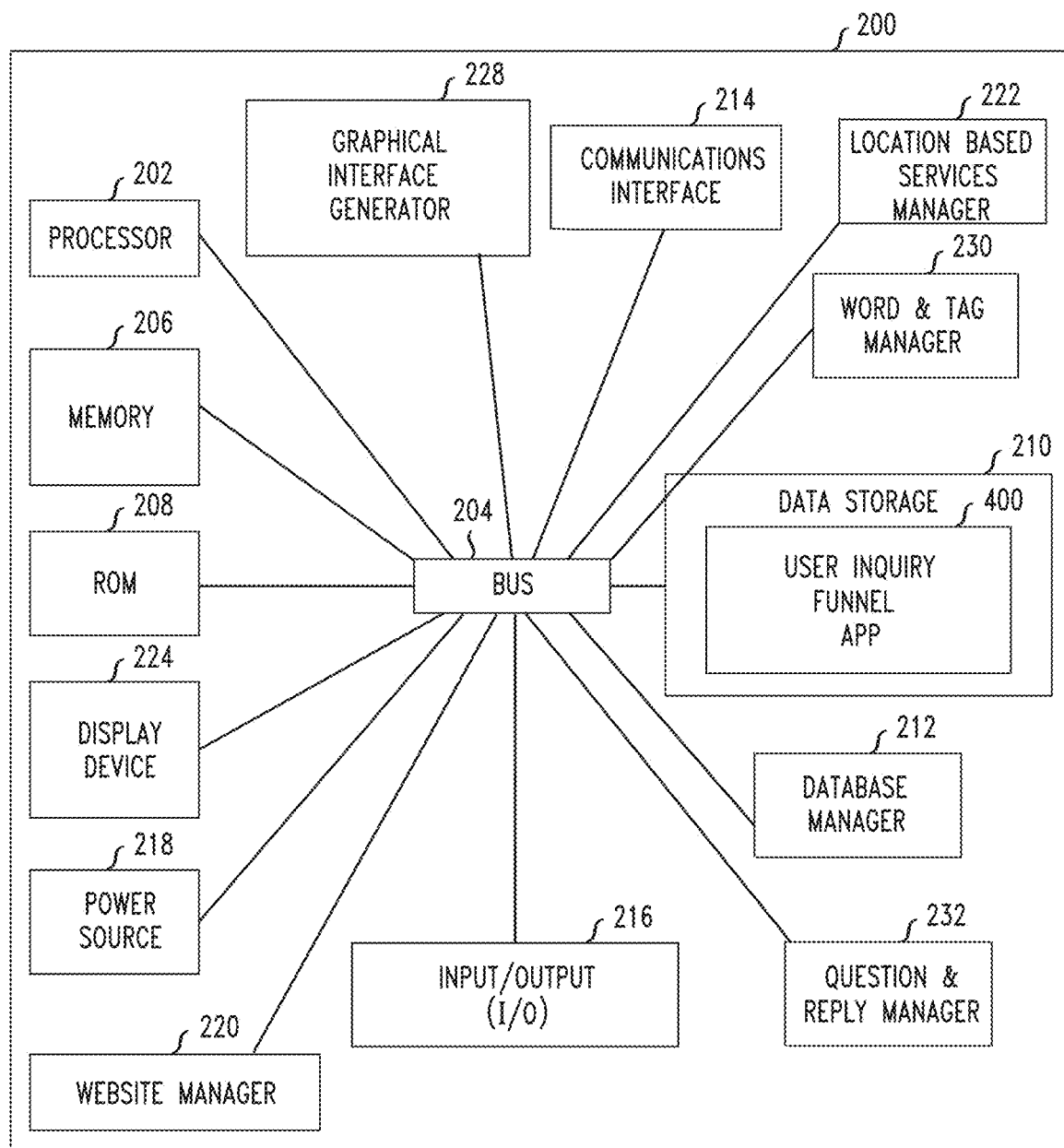
FIG. 2 presents an illustrative user inquiry funnel system in accordance with an embodiment.

Turning our attention to FIG. 2, an illustrative configuration for the user inquiry funnel system 200 is shown for deployment in the cloud network services architecture 100 in accordance with an embodiment. As shown, the user inquiry funnel system 200 comprises processor 202 for executing program code (e.g., user inquiry funnel app 400) and communications interface 214 for managing communications to and from the user inquiry funnel system 200, memory 206 and/or read only memory (ROM) 208 for storing program code and data, and power source 218 for powering the user inquiry funnel system 200. The memory 206 is coupled to the bus 204 for storing computer-readable instructions to be executed by the processor 200 (e.g., execution of the user inquiry funnel app 400). Database manager 212 is used to manage the delivery and storage of content, data, and other information in user inquiry funnel database(s) 124, database(s) 108 and across third-party content providers, for example. The database(s) 124 may store and provide information including, but not limited to, user profiles 132, user IDs 134, tag types 136, tags and variants thereof 138, word listing(s) 140, question listing(s) 142, keywords 144, and reply listing(s) 146. Word and tag manager 230 is used to for the administration and management of tags and variants thereof, and question and reply manager 232 is used for the administration and management of questions and replies, both as further detailed herein below.

Website manager 220 is used to deliver and manage content, data, and other information across one or more websites that may be utilized to access and use the user inquiry funnel system 200, for example. Further, the operations provided by and through the user inquiry funnel app 400 may be offered through a web-based application. As will be discussed in greater detail herein below, the user inquiry funnel app 400, as stored in data storage 210, when executed by the processor 202 will enable access by the plurality of inquiring users (e.g., inquiring user 1 110-1 through inquiring user N 110-N) and the plurality of responding users (e.g., responding user 1 118-1 through responding user N 118-N) to the user inquiry funnel system 200 for delivery of the user inquiry funneling hereunder. Graphical interface generator 228 facilitates the rendering and display of questions and replies, for example, on display device 224. Location-based service manager 222 facilitates the delivery of location-based services (e.g., Global Positioning System (GPS) tracking) either independently or on user device 300 thereby allowing the user inquiry funnel system 200 to register the exact location of the user of the user device 300, for example, as the user roams from one location to another location such that the location of where a particular inquiry was created and/or transmitted by the user may be displayed.

In an embodiment, the user inquiry funneling provided through the execution of the user inquiry funnel app 400 may also include a web-based delivery platform and/or accessing and interfacing any number of web using the website manager 220 for procuring information and data that can be used in the user inquiry funnel system 200. The term "website" in the context herein is used in a conventional and broadest sense and is located on at least one server containing web pages stored thereon and is operational in a 24-hour/7-day typical fashion. Further, as shown in the cloud network services architecture 100, the plurality of inquiring users (i.e., inquiring user 1 110-1 through inquiring user N 110-N) and/or the plurality of responding users (i.e., responding user 1 118-1 through responding user N 118-N) may alternatively utilize well-known Internet 122 for access to user inquiry funnel system 200 by and through a web browser on the user device 300, for example.

The communications interface 214 is used to facilitate communications across the communications links 128 (see, FIG. 1) within the cloud network services architecture 100. This may take the form, for example, of a wide area network connection that communicatively couples the user inquiry funnel system 200 with the access points 106 (see, FIG. 1) which may be a cellular communications service. Similarly, communications managed by the communications interface 214 may take the form, for example, of a local Wi-Fi network interface or Ethernet interface the communicatively couples the user inquiry funnel system 200 with the Internet 122, LAN 112, and ultimately the user device 300. In the instant embodiment, the user inquiry funnel app 400 and/or the communications interface 214 may include a communications stack for facilitating communications over the respective communications links 128. Electronic communications by and through user inquiry funnel system 200 between the various systems, networks, devices, users, entities, and/or individuals are facilitated by the communications links 128 in accordance with any number of well-known communications protocols and methods (e.g., wireless communications).

Figure 3:
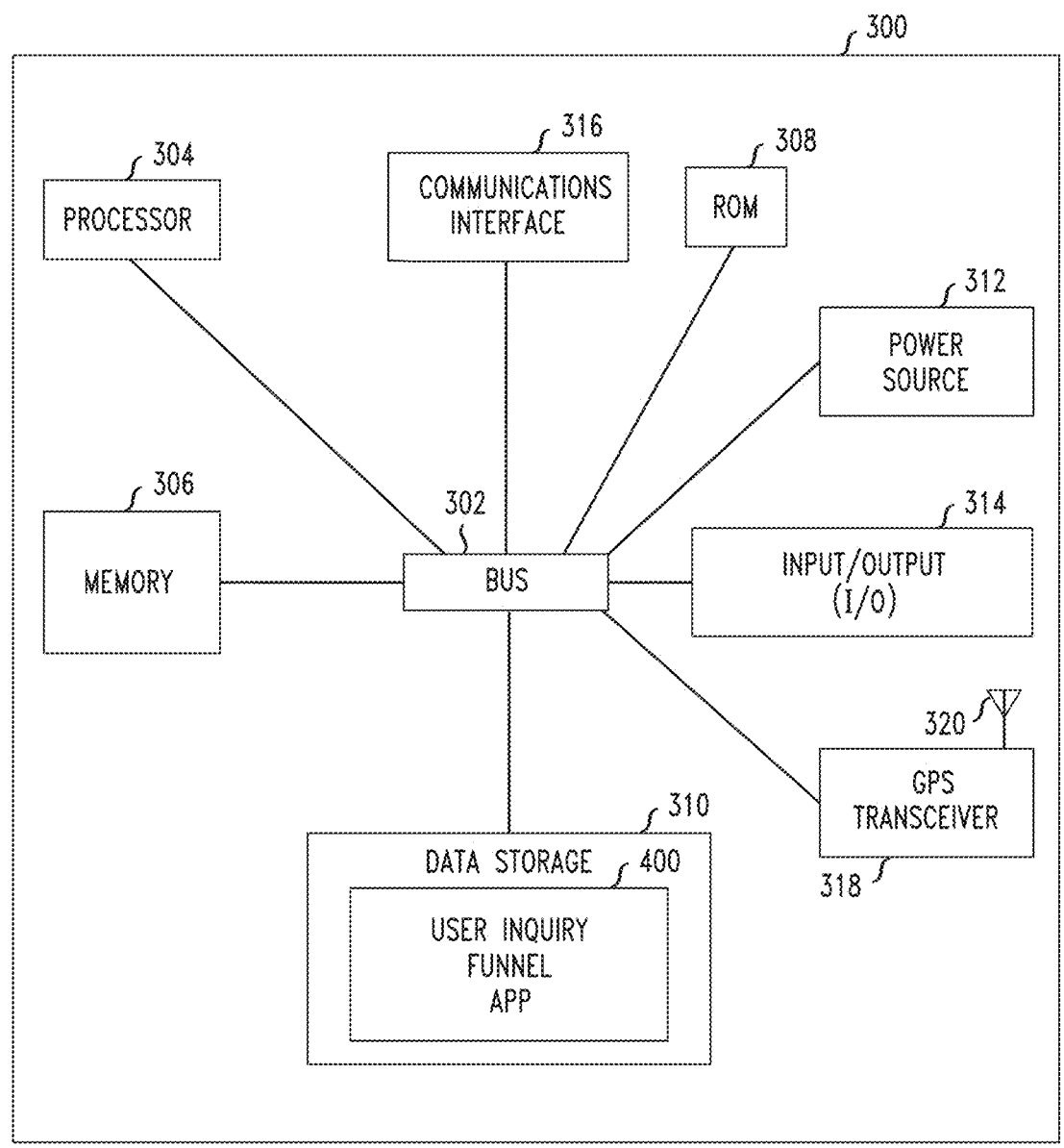
FIG. 3 presents an illustrative user device configured for use with the user inquiry funnel system of FIG. 2 in accordance with an embodiment.

Turning our attention briefly to FIG. 3, an illustrative user device 300 is shown for deployment with the cloud network services architecture 100 of FIG. 1 in accordance with an embodiment. The user device 300 typically includes bus 302 and processor 304 coupled to the bus 302 for executing operations and processing information. As will be appreciated, a "user device" in the context herein may comprise a wide variety of devices such as any type of hardware device, mobile device, smartphones, laptop computers, desktop computers, kiosks, tablets, and wearable device, to name just a few, that execute applications (e.g., a mobile application) in accordance with the principles of the disclosed embodiments herein. For example, the execution of the operations of user inquiry funnel app 400 as will be discussed in much greater detail herein below. The processor 304, as powered by power source 312, may include both general and special purpose microprocessors, and may be the sole processor or one of multiple processors of the device. This is equally applicable to the processor 202 of FIG. 2. Further, the processor 304 (or the processor 202) may comprise one or more central processing units (CPUs) and may include, be supplemented by, or incorporated in, one or more application-specific integrated circuits (ASICs) and/or one or more field programmable gate arrays (FPGAs).

The user device 300 may also include memory 306 coupled to the bus 302 for storing computer-readable instructions to be executed by the processor 304. The memory 306 may also be utilized for storing temporary variables or other intermediate information during the execution of the instructions by the processor 304. The user device 300 may also include ROM 308 or other static storage device coupled to the bus 302. Further, data storage device 310, such as a magnetic, optical, or solid-state device may be coupled to the bus 302 for storing information and instructions for the processor 304 including, but not limited to, the user inquiry funnel app 400. Data storage device 310 (or the data storage device 210) and the memory 306 (and the memory 206) may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 300 may also include one or more communications interface 316 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 316 (or the communications interface 214) may be an integrated services digital network (ISDN) card or modem/router used to facilitate data communications of various well-known types and formats. Further, illustratively, the communications interface 316 (or the communications interface 214) may be a local area network (LAN) card used to provide data communication connectivity to a comparable LAN. Wireless communication links may also be implemented. The GPS transceiver 318 and antenna 320 facilitate delivery of location-based services in order to register the exact location of the user device 300, for example, as the user roams from one location to another location. As will be understood, the application herein will be able to track individual users and their location upon the launching of the application thereby enabling the well understood GPS location features of the user device (e.g., a smartphone). As such, in accordance with the embodiment, a user's current location, and the location where they formulate an inquiry in accordance with the principles of the embodiments hereunder, may appear on the display (e.g., the display device 224) of the respective user device with the current location designation as a function of the GPS feature on their user device.

As will be appreciated, the functionality of the communication interface 316 (or the communications interface 214) is to send and receive a variety of signals (e.g., electrical, optical, or other signals) that transmit data streams representing various data types. The user device 300 may also include one or more input/output devices 314 that enable user interaction with the user device 300 (e.g., camera, display, keyboard, mouse, speakers, microphone, buttons, etc.). The input/output devices 314 (or I/O devices 216) may include peripherals, such as a camera, printer, scanner, touchscreen display, virtual reality glasses, etc. For example, the input/output devices 314 (or the I/O devices 216) may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 300 or an associated display device, for example. As detailed herein, while FIG. 3 describes an embodiment of the user inquiry funnel app 400 for execution, illustratively, on the user device 300 it will also be understood that other hardware devices may be used to execute and operate the user inquiry funnel app 400 in any real-time setting including but not limited to the cloud network services architecture 100. For example, a network-enabled portable tablet computer and/or dedicated portable hardware device may be employed equally in the context of the disclosed embodiments.

Figure 4:
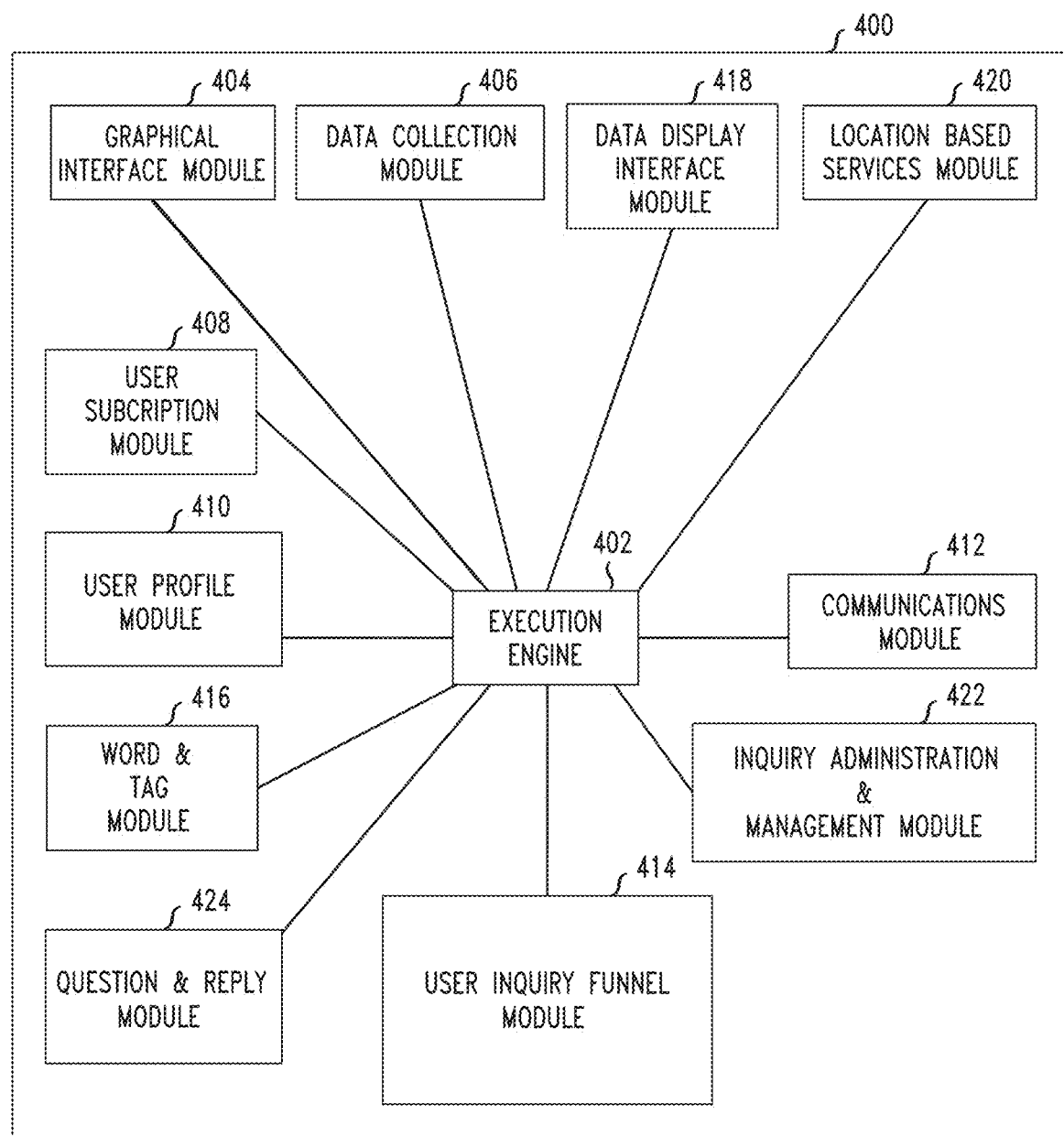
FIG. 4 presents an illustrative architecture for a user inquiry funnel app in accordance with an embodiment.

Turning our attention to FIG. 4, an illustrative architecture for the operation of the user inquiry funnel app 400 is presented in accordance with an embodiment. As will be appreciated, the architecture may be used, illustratively, in conjunction with the cloud network services architecture 100, the user inquiry funnel system 200, and/or the user device 300 for launching and executing the user inquiry funnel app 400 and its associated operations. As shown, the architecture for the operations of the user inquiry funnel app 400 provides several interfaces and engines used to perform a variety of functions such as the collection, aggregation, manipulation, processing, analyzing, verification, authentication, and display of applicable real-time information and data that are useful to achieve the user inquiry funneling of the disclosed embodiments. More particularly, data display interface module 418 and communications module 412 are used to facilitate the input/output and display of electronic data and other information to, illustratively, the users (e.g., inquiring user 1 110-1 through inquiring user N 110-N) employing the user device 300 (e.g., a touch screen of the user device 300) and executing the user inquiry funnel app 400. The data collection module 406 facilitates, for example, the collection of questions, personal/user profile information, and other information from the plurality of inquiring users (i.e., inquiring user 1 110-1 through inquiring user N 110-N), and/or replies, personal/user profile, and other information form the plurality of responding user (i.e., responding user 1 118-1 through responding user N 118-N). The location-based services module 420 provides for the delivery of location-based services in order for the geographic locations of the users to be identified and displayed (e.g., GPS locations). The communications module 412 will facilitate communications by and through the user inquiry funnel system 200, for example.

Execution engine 402 may be employed to deliver the user inquiry funneling herein through the execution of the user inquiry funnel app 400. In such delivery, the execution engine 402 will operate and execute, as further detailed herein below, with at least the following program modules: graphical interface module 404, data collection module 406, data display interface module 418, location-based services module 420, user subscription module 408, user profile module 410, communications module 412, user inquiry funnel module 414, word and tag module 416, inquiry administration and management module 422, and question and reply module 424. The operations executed by the foregoing modules will now be further discussed in greater detail.

The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system.

Figure 5:
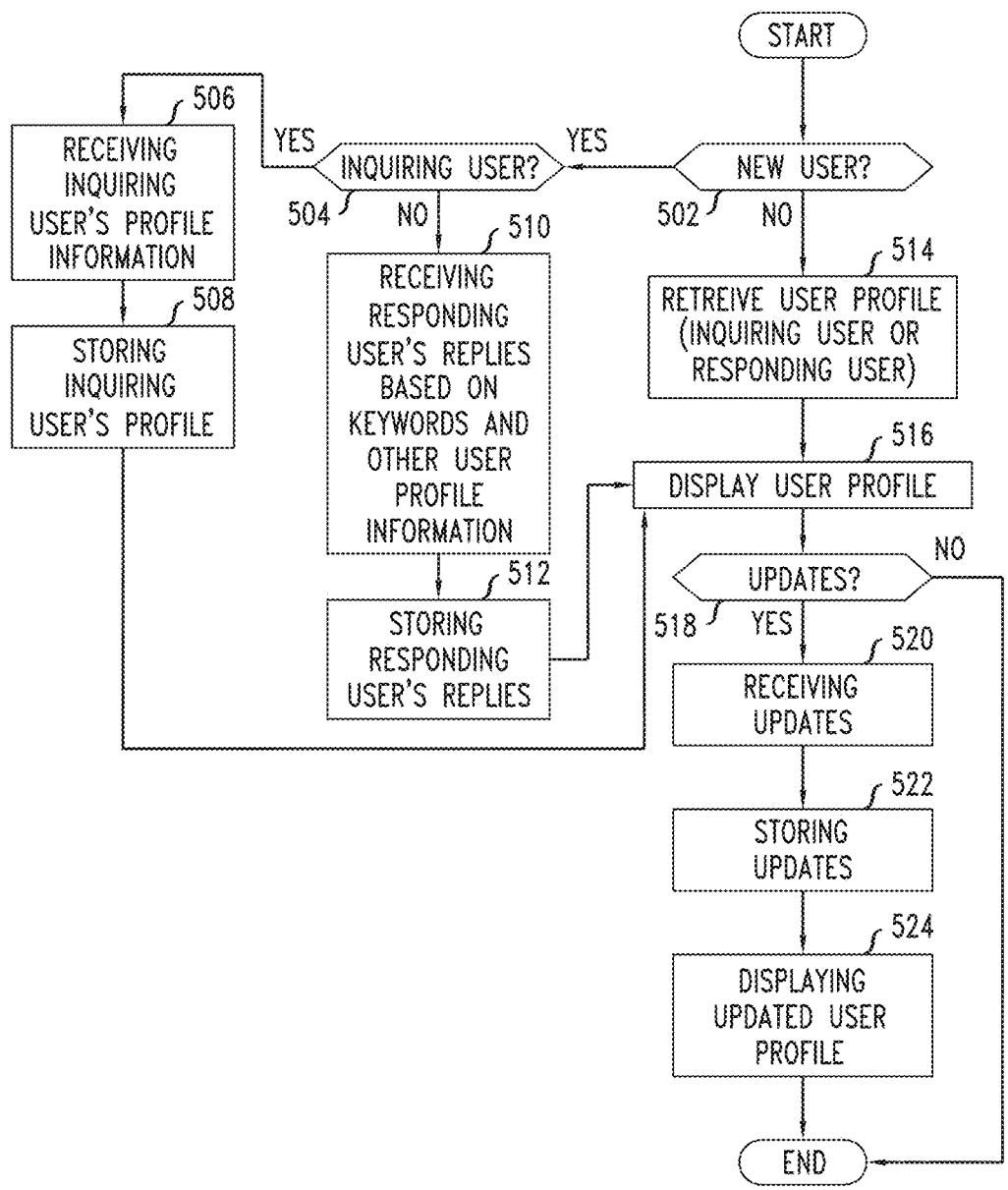
FIGS. 5 and 6 present flowcharts of illustrative operations for executing user inquiry funneling in accordance with an embodiment.
Figure 6:
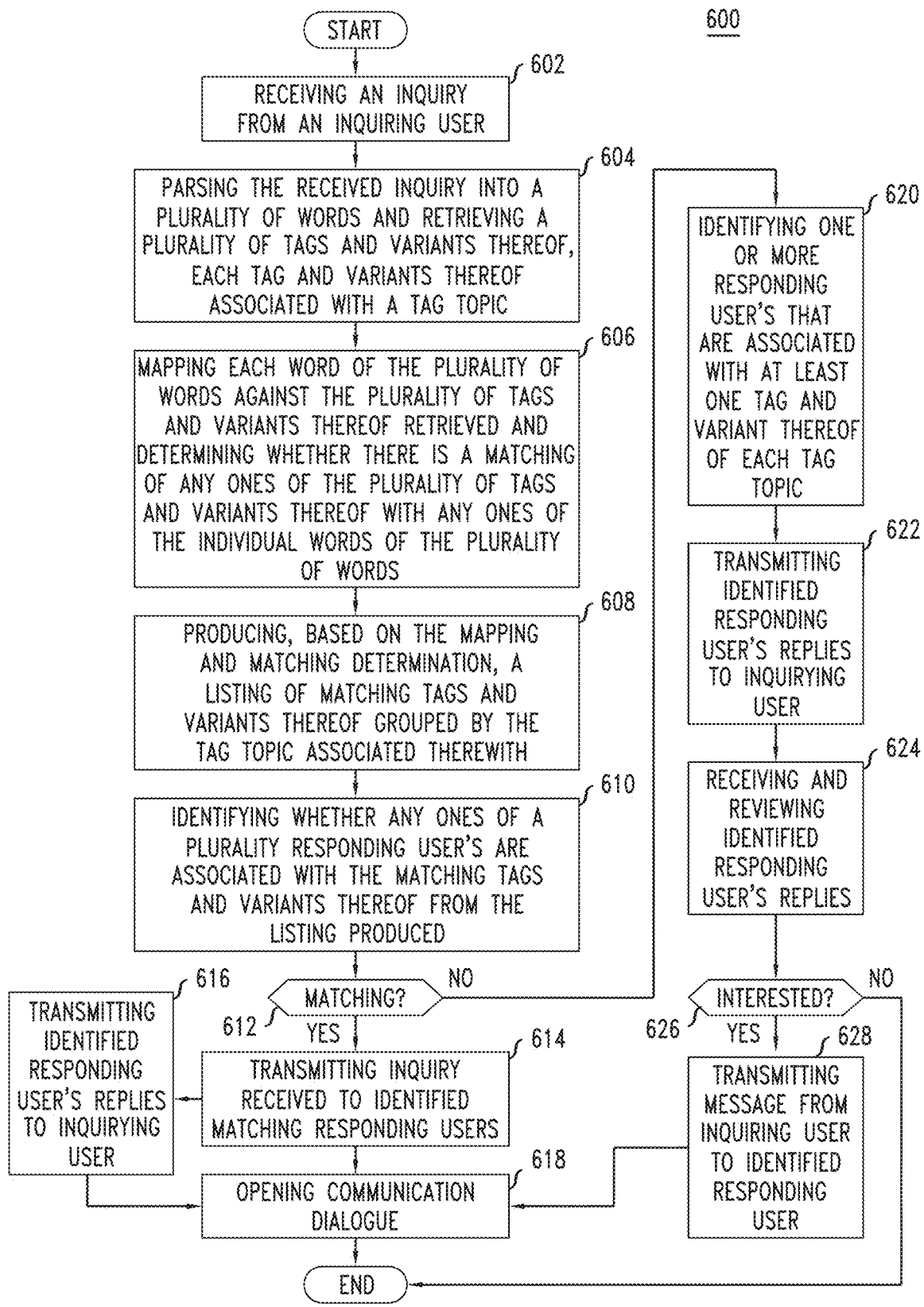

Turning our attention to FIGS. 5 and 6 flowcharts of illustrative operations 500 and 600, respectively, are presented for executing user inquiry funneling in accordance with an embodiment. At step 502, determining if a user is a new or returning user and, if a new user, then at step 504 determining whether the new user is an inquiring user. If an inquiring user, then at step 506, receiving the user's profile information and, at step 508, storing the inquiring user's profile. If the new user has not designated themselves as an inquiring user, then they must be a responding user, and, at step 510, the responding user's replies based on keywords and other user profile information is received. In an embodiment, there is a presenting of the plurality of keywords to the responding user and selecting, by the responding user, particular ones of the keywords to define a particular one pre-defined reply of their plurality of pre-defined replies for their user profile. At step 512, the responding user's profile is stored. At step 516, the user profile, an inquiring user profile or a responding user profile, as the case may be, is displayed. Step 516 is also executed if it was determined at step 502 that the user is an existing user in which case their respective user profile is retrieved, at step 514, for display. At step 518, a determination is made whether the user desires to make any changes their user profile, and if not the operations end. If changes are needed, the updates are received at step 520 and stored at step 522. At step 524, the updated user profile is display for use by the user and the operations end.

Turning our attention to FIG. 6, the operations 600 further detail the management and execution of the user inquiry funneling hereunder in accordance with an embodiment. At step 602, receiving an inquiry (e.g., a question) from an inquiring user. In an embodiment, the inquiry is in the form of a question (see, e.g., FIG. 7). Then, at step 604, parsing the inquiry received into a plurality of individual words. In this way, in accordance with the embodiment, the received inquiry is parsed into a listing of individual words. In accordance with an embodiment, there is the retrieving a plurality of tags and variants thereof, each tag and variants thereof associated with a tag topic. At step 606, mapping each individual word of the plurality of words against the plurality of tags and variants thereof retrieved and determining whether there is a matching of any ones of the plurality of tags and variants thereof with any ones of the individual words. In this way, a plurality of tags is produced as a list, for example, pursuant to references identified in the inquiry and, in an embodiment, the listing of tags is grouped by their associated topic. Before continuing with the FIG. 6 operations discussion, there will now be a discussion of these aforementioned features of the embodiments using FIGS. 7 and 8.

More particularly, turning our attention to FIG. 7, presents a series of illustrative questions with tags and their variants highlighted therein in accordance with an embodiment. Questions 700, 702, 704, 706, 708, 710, 712, and 714 are illustrative questions that may be received from an inquiring user (e.g., inquiring user 1 110-1) showing examples of the focus, content, and specificity of various types of questions that may be processed and funneled, for example, by the user inquiry funnel system 200. Each question has a specific listing of tags. That is, question Q1 700 has tags 716-1, 716-2, 716-3, and 716-4; question Q2 702 has tags 718-1, 718-2, 718-3, and 718-4; question Q3 704 has tags 720-1, 720-2, 720-3, and 720-4; question Q4 706 has tags 722-1, 722-2, 722-3, and 722-4; question Q5 708 has tags 724-1, 724-2, 724-3, 724-4, and 724-5; question Q6 710 has tags 726-1 and 726-2; question Q7 712 has tags 728-1, 728-2, 728-3, 728-4, 728-5, 728-6, and 728-7; and question Q 714 has plurality of tags 730. As noted above and further shown in FIG. 7, in an embodiment, the question is parsed into a plurality of words. Further, in an embodiment, there is the receiving of a respective user profile for each one responding user of the plurality of responding users, the respective user profile received containing a plurality of pre-defined replies, each pre-defined reply of the plurality of replies specific to a particular one tag and the variants thereof of the plurality of tags and variants thereof. In turn, generating, by the each one responding user as function of a plurality of keywords, the plurality of pre-defined replies for the respective user profile received. This may be executed, illustratively, by presenting the plurality of keywords to the each one responding user of the plurality of responding users, and selecting, by the each one responding user of the plurality of responding users, particular ones of the keywords to define a particular one pre defined reply of the plurality of pre-defined replies for their respective user profile.

In FIG. 8, an illustrative plurality of words 800 is shown having been parsed with word 1 802, word 2 804, word 3 806, word N 808, and not words 810. In accordance with the embodiments, words from the inquiry that have a negative meaning are parsed and marked accordingly as not words 810. In an embodiment, the negative meanings are identified in the received inquiry using a plurality of negative phrases comprising at least "does not include" and "not". Continuing with FIG. 8, table 812 shows an illustrative representation of tags 816 aligned with and listed by tag type/topic 814. For example, tag 820 (NYC) is a location tag type/topic 818, tag 824 (restaurant) is a category tag/type 822, and tag 828 (burger) is a category tag/type 826. Focusing on question 700 from FIG. 7 for explanation purposes, the question is directed to finding "a healthy American or vegan burger in NYC" which, in accordance with the embodiment, is parsed into individual words and mapped against the plurality of tags and variants thereof 138 retrieved by the user inquiry funnel system 200 (e.g., from user inquiry funnel database(s) to produce tags: "NYC", "vegan", "American", and "burger". As shown in table 830, tag 836 (NYC) is a location tag type/topic 818, tag 828 (burger) is a category tag type/topic 826, and tag 832 (vegan) and tag 834 (American) are cuisine tag type/topic 830, respectively.

Now, turning our attention back to FIG. 6 the operations 600 further comprise at step 606, producing, based on the mapping results, a listing of matching tags and variants thereof, the listing of matching tags and variants thereof produced being grouped by the associated tag topic therewith, and returning the listing of referenced tags by tag type/topic, at step 608. For example, as discussed herein above with respective to the illustrative table 812 and table 830 showing a variety of tags and their associated tag type/topic. Then, at step 610, identifying whether any ones of a plurality of responding users are associated with the matching tags and variants thereof from the listing produced. For example, the responding user's name may have been matched as one of the matching tags and variants thereof. In accordance with the disclosed embodiments herein, each responding user when creating and supplying their respective responding user replies (as stored, illustratively, in their user profile 900) provide the responding user's name and other information is associated (i.e., subscribed) with one or more of the tags and variants. Thus, a matched tag may be associated with the particular responding user. In accordance with the principles of the disclosed embodiments, the user inquiry funnel system 200 and associated operations are configured to have a low "ignore rate" meaning the operations will return the highest number of responding users to any one inquiry, and a high "accuracy rate" meaning that the operations will maximize the number of relevant replies from the responding users.

For example, continuing with the question 700 from FIG. 7, the results returned include the list of tags: location: NYC, cuisine: vegan, cuisine: American and category: burger. So, a relevant responding user identified by the user inquiry funnel system 200 will have to match with the tags "NYC, vegan, burger" and/or "NYC, American, burger", and/or "NYC, vegan, American, burger". In this way, if a responding user matches only with "NYC, vegan" their replies are not used in response to this inquiry as this responding user may be offering "pizza" or "sushi" rather than the "burger" identified in the relevant tag listing for this inquiry. In this way, the replies sent to the inquiring user from the identified responding users are more likely to of interest to the inquiring user based on their transmitted inquiry. In accordance with the disclosed embodiments, this is facilitated by using the matching threshold. Illustratively, in an embodiment, the matching threshold is defined as a minimum number of matching tags and variants thereof with the individual words as parsed from the inquiry. Of course, this is just one of many different matching threshold variations that may be utilized.

At step 612, if there is at least one responding user identified as being associated with any ones of the matching tags and variants thereof from the listing produced, transmitting the inquiry received, at step 614, to the at least one responding user identified, and at step 616, transmitting, to the inquiring user, one or more pre-defined replies provided by the at least one responding user identified, each one of the one or more pre-defined replies being associated with at least one of the matching tags and variants thereof from the listing produced. In an embodiment, there is displaying, on the mobile device, a location of the inquiring user where the inquiry received was created by the inquiring user. Having identified at least one responding user (from the associated matching tags and variants thereof), opening a communication dialogue, at step 618, by establishing a communication between the inquiring user and the at least one responding user identified and the operations end. However, at step 612, if there not is at least one responding user identified as being associated with any ones of the matching tags and variants thereof from the listing produced, then, at step 620, identifying at least one responding user of the plurality of responding users that is associated with at least one tag and variant thereof of each associated tag topic of the plurality of tags and variants thereof retrieved. This provides another path in attempting to respond to the received inquiry and identifying an appropriate rely from a responding party. At step 622, transmitting to the inquiring user one or more pre-defined replies provided by the at least one responding user identified that is associated with at least one tag and variant thereof of each associated tag topic of the plurality of tags and variants thereof retrieved, and at step 624, receiving and reviewing the identified responding user's replies to determine, at step 626, if there is any interest from the inquiring user. If so, at step 628, transmitting an indication of interest (e.g., a message) from the inquiring user based on the one or more pre-defined replies as provided by the at least one responding user identified that is associated with at least one tag and variant thereof of each associated tag topic of the plurality of tags and variants thereof retrieved. Then, opening a communication dialogue, at step 618, by establishing a communication between the inquiring user and the at least one responding user identified and the operations end. In an embodiment, there is the preventing the at least one responding user identified that is associated with at least one tag and variant thereof of each associated tag topic of the plurality of tags and variants thereof retrieved from communicating with the inquiring user unless and until the indication of interest is transmitted the at least one responding user identified that is associated with at least one tag and variant thereof of each associated tag topic of the plurality of tags and variants thereof retrieved from communicating with the inquiring user unless and until the indication of interest is transmitted. This eliminates any inappropriate or unwanted contacts with and to the inquiring user.

In an embodiment, the inquiring and responding users may initially subscribe for a defined fee, for example, in a tier subscription system such that users who pay more for their access subscription are provided priority and other advantages over other users in lower tiers (e.g., access to a higher number of questions or responses, unlimited numbers of questions or replies, additional search criteria, more services, etc.) or who are subscribed through a base "no fee" trial plan (e.g., a free 30 day trial period). The user subscription module 408 and the user profile module 410 will provide, illustratively, for this subscription optionality and for the creation and maintenance of the respective user profiles for each inquiring user.

Turning our attention briefly to FIG. 9, an illustrative user profile 900 is shown in accordance with an embodiment. The illustrative user profile 900 may be used for an inquiring user or a responding user, as the case may be, and comprises username 902, user identification (ID) 904 (as issued during the subscription operation, as detailed above), user contact information 906, question receipt preference 908 (allowing a responding user to designated whether they wish to receive or not receive question, for example, for a defined period of time), user information 910, user-created keyword replies 912 (i.e., the responding user's replies), financial information 916, and other information 914.

Figure 10:
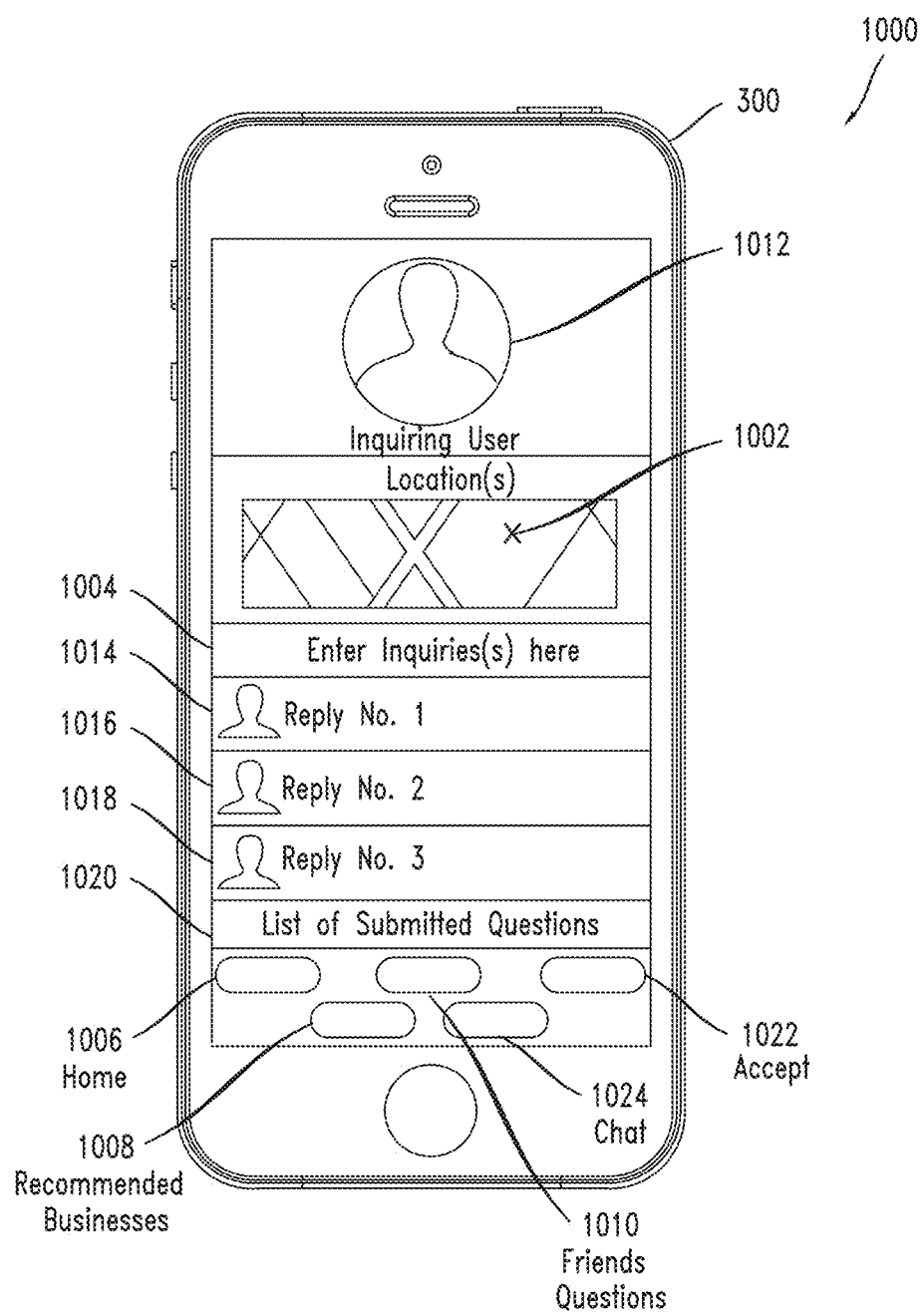
FIG. 10 presents an illustrative user interface for an inquiring user in accordance with an embodiment.

Turning our attention to FIG. 10, an illustrative user interface 1000 for an inquiring user is shown in accordance with an embodiment. For example, as shown, the user interface 1000 may be that as associated with the user device 300. The user interface 1000 comprises an inquiring user identification and user profile area 1012, location(s) 1002 (as noted above, in accordance with an embodiment, the inquiring user's location may be displayed at the location that a particular inquiry was created). The inquiring user's inquiry may be entered in inquiry area 1004 and the responding user replies 1014, 1016, and 1018, respectively, are displayed. Listing of submitted questions 1020 shows a history of pending/submitted questions. Home icon 1006 for returning the user interface 1000 to a home configuration. Recommended businesses icon 1008 that may be used by the inquiring user to research one or more recommend businesses as associated with one or more responding users. Friends' questions icon 1010 to interface with other known inquiring users that a particular user has "friended" and may want to chat with (using chat icon 1024). Accept icon 1022 may be used by the inquiring user to accept one or more of the received responding user replies (e.g., the responding user replies 1014, 1016, and 1018) to their inquiry.

Figure 11:
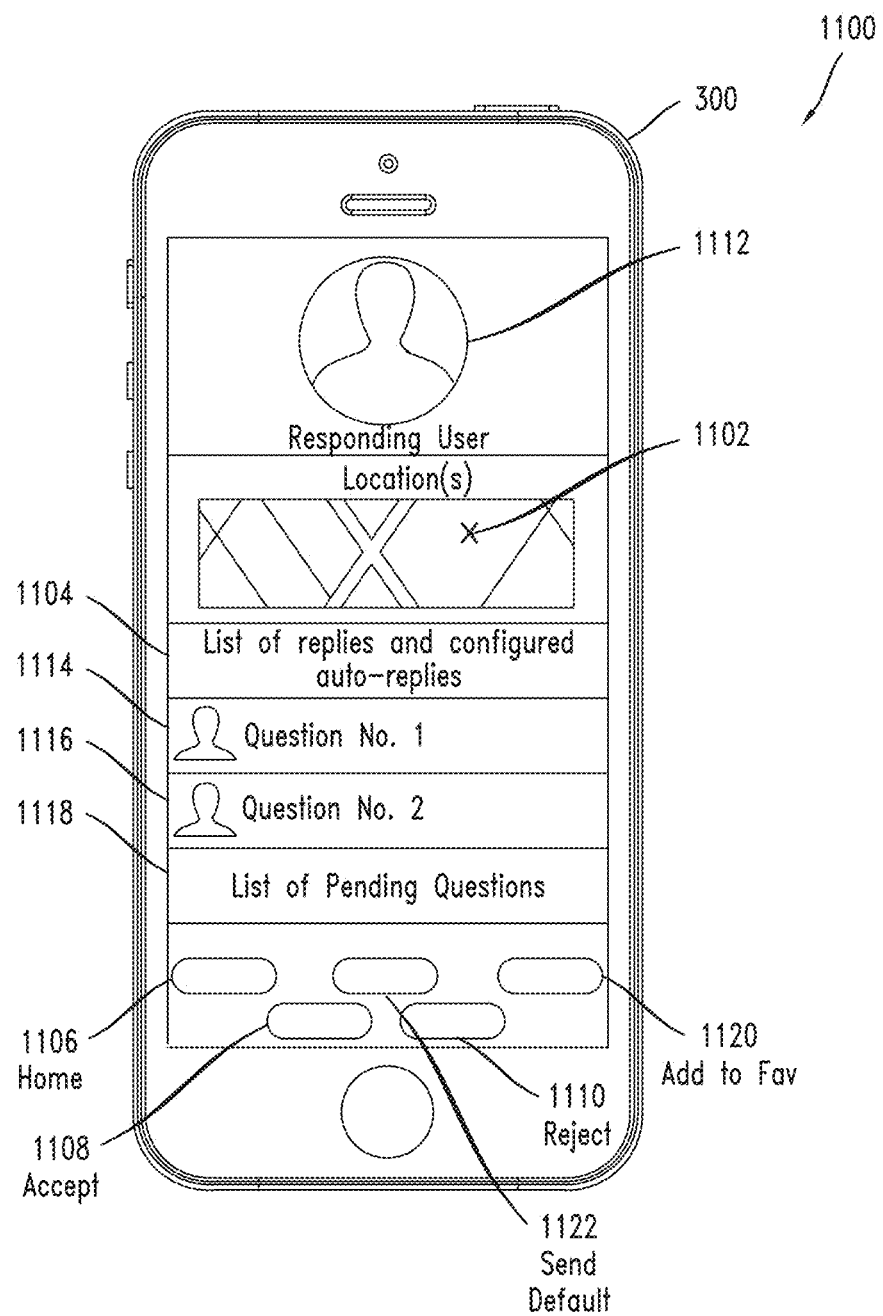
FIG. 11 presents an illustrative user interface for a responding user in accordance with an embodiment.

Turning our attention to FIG. 11 an illustrative user interface 1100 for a responding user is shown in accordance with an embodiment. For example, as shown, the user interface 1100 may be that as associated with the user device 300. The user interface 1100 comprises a responding user identification and user profile area 1112, location(s) 1102 (as noted above, in accordance with an embodiment, the inquiring user's location may be displayed at the location that a particular inquiry was created), list of replies and configured auto-replies area 1104, inquiring user questions 1114 and 1116, respectively, and listing of pending questions 1118. Home icon 1106 for returning the user interface 1100 to a home configuration. Accept icon 1108 that may be used by the responding user to accept a communication (i.e., indication of interest) from one or more inquiring users. Reject icon 1110 that may be used by the responding user to reject a communication (i.e., indication of interest) from one or more inquiring users or other inquiries. Add to Favorites icon 1120 may be used by the responding user to a particular inquiry to a favorites listing for future reference. Send default 1122 may be used by the responding user to trigger the transmission of one or more default replies to an inquiring user.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIGS. 5-6) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A user inquiry funnel system comprising:
   a processor;
   a memory storing instructions that when executed cause the processor to perform operations comprising:

receiving an inquiry from an inquiring user;
parsing the inquiry received into a plurality of individual words and retrieving a plurality of tags and variants thereof, each tag and variants thereof associated with a tag topic;
mapping each individual word of the plurality of words against the plurality of tags and variants thereof retrieved and determining whether there is a matching of any ones of the plurality of tags and variants thereof with any ones of the individual words of the plurality of individual words;
producing, based on the mapping and the matching determination, a listing of matching tags and variants thereof, the listing of matching tags and variants thereof produced being grouped by the tag topic associated therewith;
identifying whether any ones of a plurality of responding users are associated with the matching tags and variants thereof from the listing produced; and
   if there is at least one responding user identified as being associated with any ones of the matching tags and variants from the listing produced, transmitting the inquiry received to the at least one responding user identified, and transmitting, to the inquiring user, one or more pre-defined replies provided by the at least one responding user identified, each one of the one or more pre-defined replies being associated with at least one of the matching tags and variants thereof from the listing produced;
   if there is not at least one responding user identified as being associated with any ones of the matching tags and variants thereof from the listing produced, identifying at least one responding user of the plurality of responding users that is associated with at least one tag and variant thereof of each associated tag topic of the plurality of tags and variants thereof retrieved, and transmitting to the inquiring user one or more pre-defined replies provided by the at least one responding user identified that is associated with at least one tart and variant thereof of each associated tag topic of the plurality of tags and variants thereof retrieved; and
transmitting an indication of interest from the inquiring user based on the one or more pre defined replies as provided by the at least one responding user identified that is associated with at least one tag and variant thereof of each associated tag topic of the plurality of tags and variants thereof retrieved.

2. The user inquiry funnel system of claim 1, wherein the operations performed by the processor further comprise:
receiving, by the inquiring user, the one or more pre-defined replies transmitted, and
establishing a communication between the inquiring user and the at least one responding user identified.

3. The user inquiry funnel system of claim 1, wherein the operations performed by the processor further comprise
establishing, responsive to the indication of interest transmitted, a communication between the inquiring user and the at least one responding user identified that is associated with at least one tag and variant thereof of each associated tag topic of the plurality of tags and variants thereof retrieved.

4. The user inquiry funnel system of claim 3, wherein the indication of interest transmitted is a message from the inquiring user to the at least one responding user identified that is associated with at least one tag and variant thereof of each associated tag topic of the plurality of tags and variants thereof retrieved.

5. The user inquiry funnel system of claim 1, wherein the operations performed by the processor further comprise:
receiving a respective user profile for each one responding user of the plurality of responding users, the respective user profile received containing a plurality of pre-defined replies, each pre-defined reply of the plurality of replies specific to at least one tag and the variants thereof of the plurality of tags and variants thereof.

6. The user inquiry funnel system of claim 5, wherein the operations performed by the processor further comprise:
generating, by the each one responding user as function of a plurality of keywords, the plurality of pre-defined replies for the respective user profile received.

7. The user inquiry funnel system of claim 6, wherein the operations performed by the processor further comprise:
presenting the plurality of keywords to the each one responding user of the plurality of responding users; and
selecting, by the each one responding user of the plurality of responding users, particular ones of the keywords to define a particular one pre-defined reply of the plurality of pre-defined replies for the respective user profile received therefore.

8. The user inquiry funnel system of claim 1, wherein the operations performed by the processor further comprise:
receiving, by the inquiring user, the one or more pre-defined replies transmitted.

9. The user inquiry funnel system of claim 1, wherein the parsing the inquiry received into a plurality of individual words operation performed by the processor further comprises:
identifying any word in the inquiry received associated with a negative meaning.

10. The user inquiry funnel system of claim 9, wherein the negative meaning is identified by a plurality of negative phrases comprising at least "do not include" and "not".

11. The user inquiry funnel system of claim 1, wherein the inquiry received is formed as a question.

12. The user inquiry funnel system of claim 1, wherein the operations performed by the processor further comprise:
displaying, on a mobile device, a location of the inquiring user where the inquiry received was created by the inquiring user.

13. The user inquiry funnel system of claim 1, wherein the operations performed by the processor further comprise:
preventing the at least one responding user identified that is associated with at least one tag and variant thereof of each associated tag topic of the plurality of tags and variants thereof retrieved from communicating with the inquiring user unless and until the indication of interest is transmitted.

14. A user inquiry funnel system comprising:
a processor;
a memory storing instructions that when executed cause the processor to perform operations comprising:
receiving an inquiry from an inquiring user;
receiving a respective user profile for each one responding user of a plurality of responding users, the respective user profile received containing a plurality of pre-defined replies, each pre defined reply of the plurality of replies specific to at least one tag and the variants thereof of the plurality of tats and variants thereof;

parsing the inquiry received into a plurality of individual words and retrieving a plurality of tags and variants thereof, each tag and variants thereof associated with a tag topic;

mapping each individual word of the plurality of words against the plurality of tags and variants thereof retrieved and determining whether there is a matching of any ones of the plurality of tags and variants thereof with any ones of the individual words of the plurality of individual words;

producing based on the mapping and the matching determination, a listing of matching tags and variants thereof, the listing of matching tags and variants thereof produced being grouped by the tag topic associated therewith;

identifying whether any ones of the plurality of responding users are associated with the matching tags and variants thereof from the listing produced; and if there is at least one responding user identified as being associated with any ones of the matching tags and variants from the listing produced, transmitting the inquiry received to the at least one responding user identified, and transmitting, to the inquiring user, one or more pre-defined replies provided by the at least one responding user identified, each one of the one or more pre-defined replies being associated with at least one of the matching tags and variants thereof from the listing produced;

if there is not at least one responding user identified as being associated with any ones of the matching tags and variants thereof from the listing produced, identifying at least one responding user of the plurality of responding users that is associated with at least one tag and variant thereof of each associated tag topic of the plurality of tags and variants thereof retrieved; and transmitting to the inquiring user one or more pre-defined replies provided by the at least one responding user identified that is associated with at least one tag and variant thereof of each associated tag topic of the plurality of tags and variants thereof retrieved;

receiving by the inquiring user, the one or more pre-defined replies transmitted;

transmitting an indication of interest from the inquiring user based on the one or more pre defined replies as provided by the at least one responding user identified that is associated with at least one tag and variant thereof of each associated tag topic of the plurality of tags and variants thereof retrieved; and establishing, responsive to the indication of interest transmitted, a communication between the inquiring user and the at least one responding user identified that is associated with at least one tag and variant thereof of each associated tag topic of the plurality of tags and variants thereof retrieved.

15. The user inquiry funnel system of claim 14, wherein the operations performed by the processor further comprise:

generating, by the each one responding user as function of a plurality of keywords, the plurality of pre-defined replies for the respective user profile received therefore.

16. A user inquiry funnel system comprising:
a processor;
a memory storing instructions that when executed cause the processor to perform operations comprising:
receiving an inquiry from an inquiring user;

receiving a respective user profile for each one responding user of a plurality of responding users, the respective user profile received containing a plurality of pre-defined replies, each pre defined reply of the plurality of replies specific to at least one tag and the variants thereof of the plurality of tags and variants thereof;

parsing the inquiry received into a plurality of individual words and retrieving a plurality of tags and variants thereof, each tag and variants thereof associated with a tag topic;

mapping each individual word of the plurality of words against the plurality of tags and variants thereof retrieved and determining whether there is a matching of any ones of the plurality of tags and variants thereof with any ones of the individual words of the plurality of individual words;

producing, based on the mapping and the matching determination, a listing of matching tags and variants thereof, the listing of matching tags and variants thereof produced being grouped by the tag topic associated therewith;

identifying whether any ones of the plurality of responding users are associated with the matching tags and variants thereof from the listing produced;

if there is at least one responding user identified as being associated with any ones of the matching tags and variants from the listing produced:
transmitting the inquiry received to the at least one responding user identified;
transmitting, to the inquiring user, one or more pre-defined replies provided by the at least one responding user identified, each one of the one or more pre-defined replies being associated with at least one of the matching tags and variants thereof from the listing produced;
receiving, by the inquiring user, the one or more pre-defined replies transmitted; and
establishing a communication between the inquiring user and the at least one responding user identified; and if there is not at least one responding user identified as being associated with any ones of the matching tags and variants thereof from the listing produced;
identifying at least one responding user of the plurality of responding users that is associated with at least one tag and variant thereof of each associated tag topic of the plurality of tags and variants thereof retrieved;
transmitting to the inquiring user one or more pre-defined replies provided by the at least one responding user identified that is associated with at least one tag and variant thereof of each associated tag topic of the plurality of tags and variants thereof retrieved;
transmitting an indication of interest from the inquiring user based on the one or more pre-defined replies as provided by the at least one responding user identified that is associated with at least one tag and variant thereof of each associated tag topic of the plurality of tags and variants thereof retrieved; and
establishing, responsive to the indication of interest transmitted, a communication between the inquiring user and the at least one responding user identified that is associated with at least one tag and variant thereof of each associated tag topic of the plurality of tags and variants thereof retrieved.

* * * * *